Oct. 23, 1962  M. MACCAFERRI  3,060,302
HEAT CONTROL SYSTEMS FOR PLASTICIZING CYLINDERS
Filed Oct. 28, 1960  3 Sheets-Sheet 2
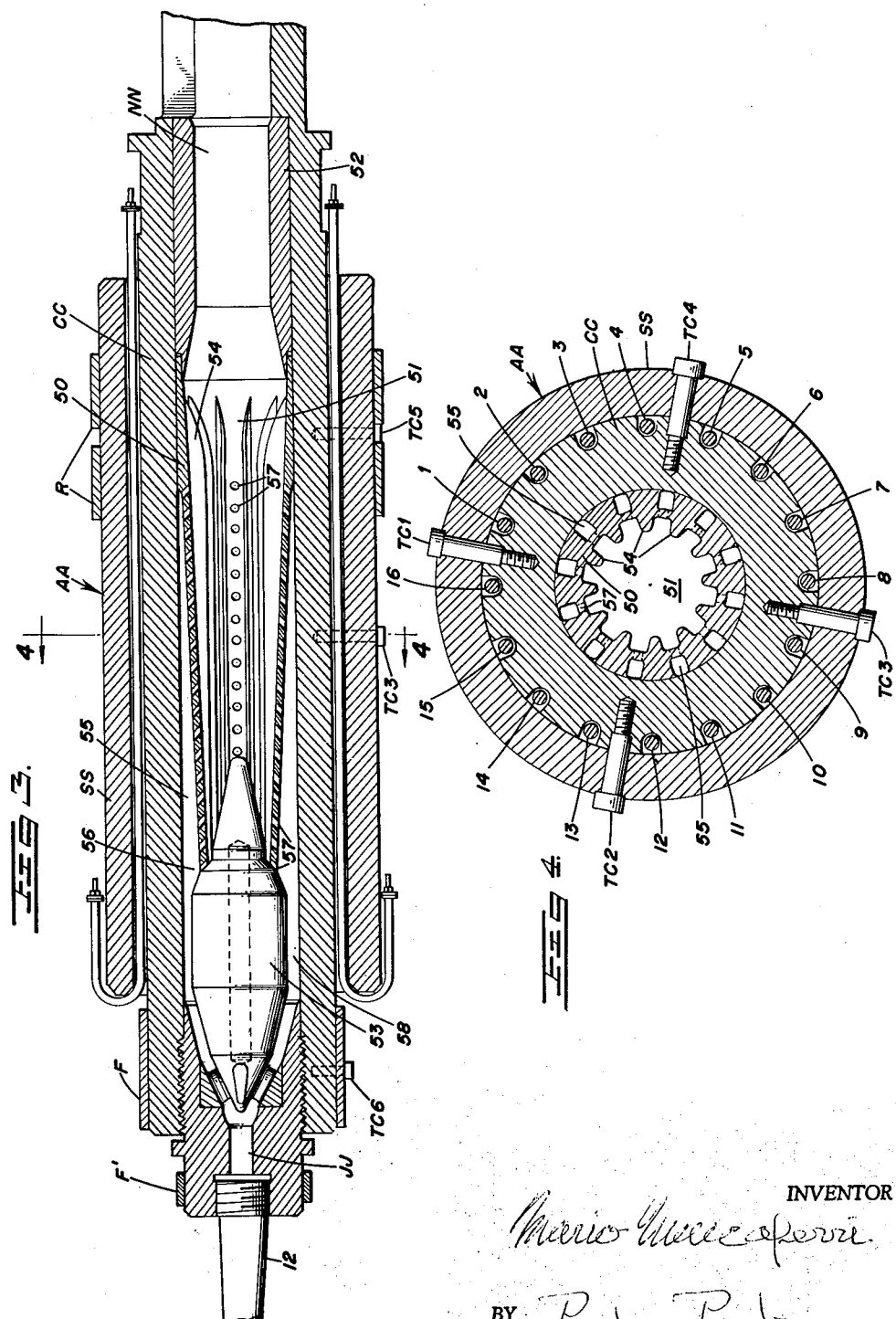

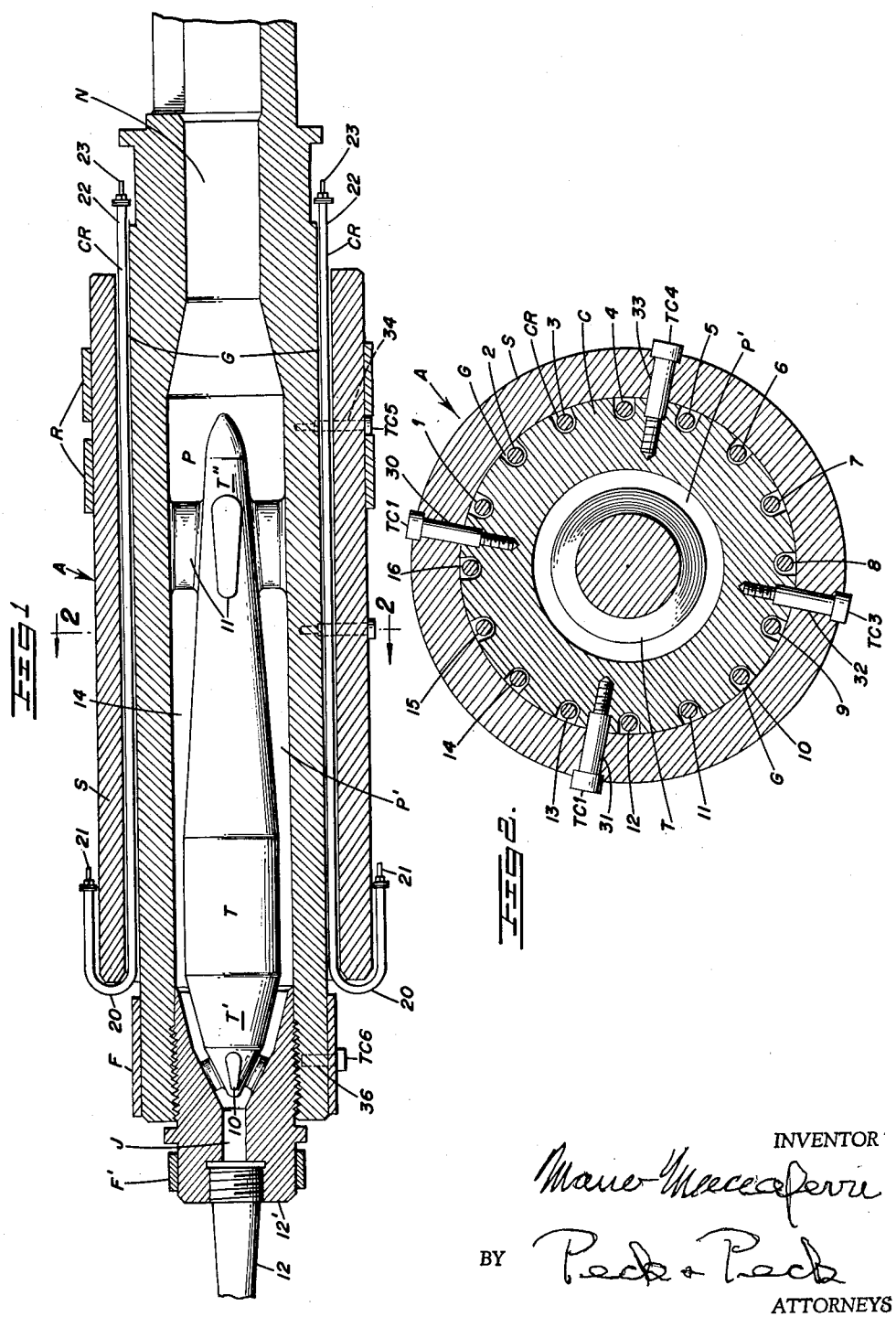

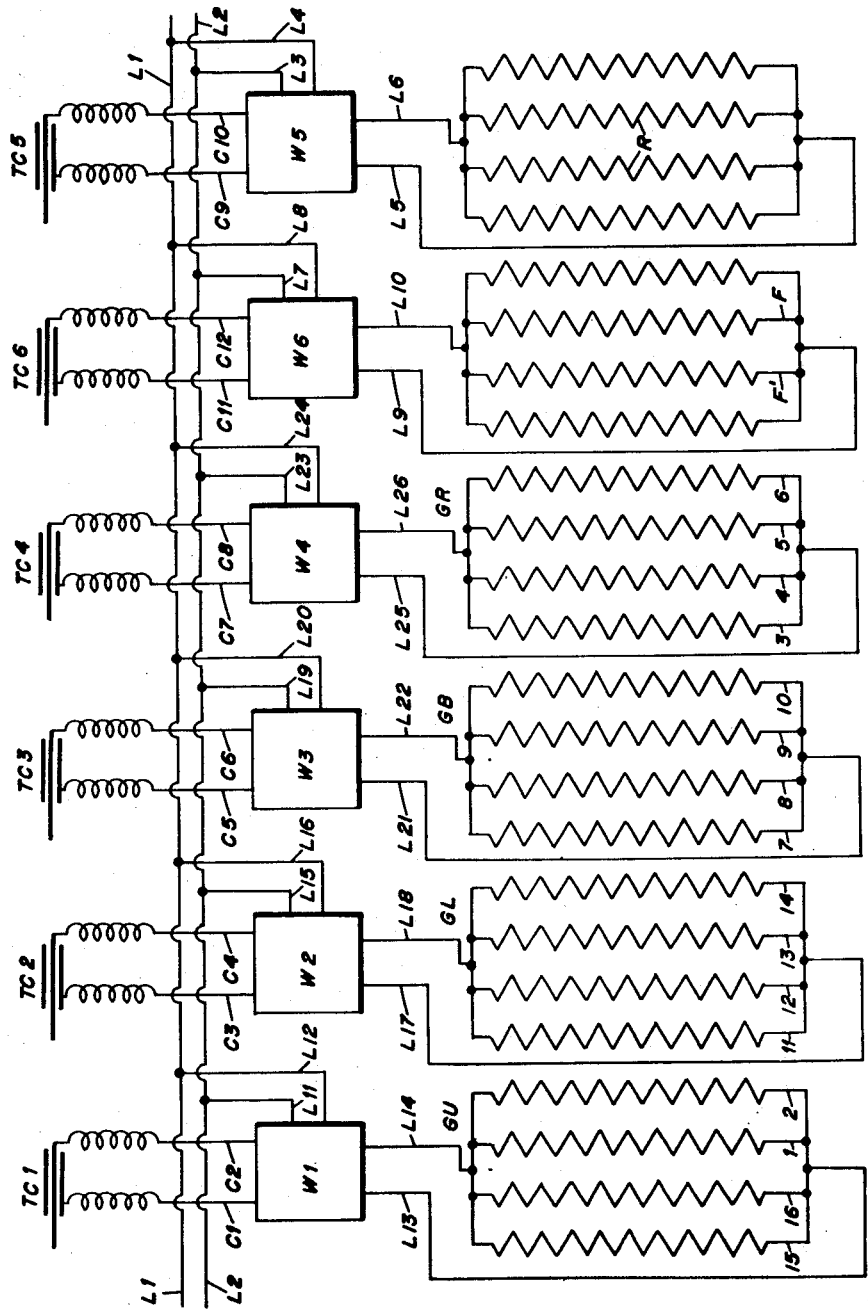

United States Patent Office 3,060,302
Patented Oct. 23, 1962

3,060,302
HEAT CONTROL SYSTEMS FOR PLASTICIZING
CYLINDERS
Mario Maccaferri, 24 Redfield St., Rye, N.Y.
Filed Oct. 28, 1960, Ser. No. 65,773
3 Claims. (Cl. 219—39)

This invention relates to certain improvements in heat control systems for plasticizing cylinders; and the nature and objects of the invention will be readily recognized and understood by those skilled in the arts to which the invention relates in the light of the following explanation and detailed description of the accompanying drawings illustrating what I now believe to be preferred embodiments or mechanical and electrical expressions of a heat control system of my invention, from among various other embodiments, expressions, designs and combinations of which the invention is capable within the broad spirit and scope thereof, as defined by the claims hereto appended.

The heat softening or melting of thermoplastic materials to readily flowable condition for injection molding, blow-molding or other processing therewith, is generally carried out in so-called plasticizing chambers or cylinders. Such plasticizing cylinders typically consist of a cylinder structure of heat conducting material providing a plasticizing chamber therewithin which receives and through which there is forced a mass of plastic to be melted or plasticized by heat supplied to the cylinder structure and conducted through the material thereof to the plastic to heat soften or melt such plastic in the plasticizing chamber. The resulting heat softened or melted plastic is then forced in readily flowable conditions from the plasticizing cylinder for injection into a mold or other component. The heating of such a plasticizing cylinder is usually effected by means of electrical heating bands that are positioned around the exterior of the cylinder with the heat supplied by such bands being conducted by the material of the cylinder structure directly to the mass of plastic in the plasticizing chamber. The plastic to be heat softened is usually supplied to the plasticizing chamber in solid, granular form through an intake opening at one end of the cylinder. Such granular plastic is forced under pressure into the plasticizing chamber and the heat softened or melted plastic is pressure discharged from the plasticizing chamber through a discharge opening at the opposite end of the cylinder structure.

In the operation and use of such plasticizing cylinders under commercial production conditions it is frequently found that particles of the plastic material being plasticized are burned or decomposed by overheating or by subjecting to heat over too long a period of time with the resulting contamination and discoloration and damage to the structure of the heat softened plastic or melt when the latter is discharged from the plasticizing cylinder. Also, it is difficult with such cylinders to obtain the highly necessary complete and uniform plasticizing or melting of the plastic material without burning and damaging portions thereof during the movement of the plastic material through and the heat softening or melting thereof in the plasticizing cylinder.

Such plasticizing cylinders are almost universally mounted in horizontal position. It has been determined that due to the action of gravitational forces on the mass of plastic being forced into and through the plasticizing chamber of a horizontally mounted cylinder, the forced movement of the plastic through the cylinder is not along lines substantially parallel with the horizontal axis of the cylinder, as would be expected, but is on the contrary generally along paths inclined downwardly and forwardly through the cylinder from the intake thereof so that the lower portion of the plasticizing chamber appears to receive more plastic material than does the upper portion of the chamber. In addition to the effect of gravitational forces on the plastic material being forced into and through the plasticizing chamber of the cylinder, it appears that the heat being conducted into the plasticizing chamber from the heating bands rises in the chamber from the lower portions to the upper portions thereof so that the temperatures at the upper portions of the plasticizing chamber will be found to be higher than the temperatures at the lower portions of the chamber. In some instances it has been found that the temperature in the upper portion of the plasticizing chamber of a plasticizing cylinder was as much as 40° F. higher than the temperature at the lower portion of the chamber. Hence, with the average production operations of such a plasticizing cylinder non-uniform temperature conditions prevail at different areas and locations in the cylinder and within the plasticizing chamber and the mass of plastic being heated and plasticized therein, with the temperature conditions at some locations being below the critical temperature range for melting the plastic. This results in highly inefficient plasticizing with non-uniform and incomplete melting which in turn results in structurally unsound and poor quality plastic structures formed from such incompletely and non-uniformly melted plastic.

As commercially produced thermoplastics attain increasing degrees of refinement and perfection, they have become more sensitive to heat and to heat conditions so that the ranges of temperatures to which they can be subjected for heat softening or melting to the required degree of uniform and complete plasticizing without deterioration or damage to the plastic have narrowed and become increasingly restricted. Thus, a difference of only a few degrees above the critical temperature can cause deterioration and damage to such a critically heat-sensitive thermoplastic material. Also, such a thermoplastic will deteriorate and be damaged if subjected to a temperature within its critical resistance range for too long a period of time. Among the more critically heat-sensitive of the thermoplastic materials may be mentioned polyvinyl chloride, linear polyethylene, saran, and ethocel, so that with such heat critical thermoplastics the foregoing conditions encountered in plasticizing them in plasticizing cylinders become greatly aggravated and increase the problems of complete and uniform heat softening and melting in the known types of plasticizing cylinders.

The unequal heating conditions that are encountered at different locations in a plasticizing cylinder cannot be practically compensated for or corrected by merely supplying additional heat to the plasticizing cylinder by the cylinder heaters in order to increase the supply of heat to the portions of the plasticizing chamber and cylinder structure that are below proper plasticizing temperatures, because to do so will only result in supplying more heat to those portions of the plasticizing chamber and cylinder structure that are already within the required critical temperature range for proper plasticizing. Such a supply of additional heat to the plasticizing cylinder will raise the portions of the plasticizing chamber and cylinder structure that are within the critical temperature range for plasticizing to temperatures above that range and result in burning and damage to the portions of the thermoplastic that are in heat transfer relation with such overheated portions of the plasticizing chamber and of the cylinder structure. Conversely, if the portions of the plasticizing chamber and cylinder structure that are at temperatures within the critical range for melting and plasticizing the particular plastic being plasticized are maintained within such temperature range, then it follows that under the prevailing conditions as hereinbefore pointed out, portions of the plasticizing chamber and cylinder structure may be at temperatures below the critical range for plasticizing with insufficient heat being supplied to uniformly melt and plasticize the thermoplastic. Under these conditions it follows that the thermoplastic will be discharged from the plasticizing cylinder in incompletely and nonuniformly melted and plasticized state. And this result which arises out of the foregoing conditions of unequal heating throughout portions of the plasticizing chamber and cylinder structure is further aggravated by the fact that the gravitational forces acting on the thermoplastic being forced into and through the plasticizing material causes more material to be received in and through the lower portion of the plasticizing chamber than in and through the upper portion thereof so that the effect of the temperature differentials in the plasticizing chamber and cylinder structure are increased.

My present invention is directed toward efficiently and practically overcoming and reducing the effects of the conditions that result in portions of the plasticizing chamber and of the cylinder structure of a plasticizing cylinder being supplied with insufficient heat to maintain such portions within the critical temperature range for plasticizing while the remaining portions of the plasticizing chamber and cylinder structure are being supplied with sufficient plasticizing heat.

A primary object of the invention is to effect the elimination of or reduction in the effects of the foregoing conditions encountered with plasticizing cylinders by providing an automatically operating heat supply control system by which all of the plasticizing portions of the plasticizing chamber and cylinder structure are maintained at the proper plasticizing temperatures required by any particular thermoplastic being melted to thereby ensure uniform and complete plasticizing without deterioration, decomposition or temperature damage to any portion of the thermoplastic.

Another object is to provide a heat supply control system by which heat is automatically supplied to any portion of the plasticizing cylinder structure and plasticizing chamber therewithin that requires additional heat to maintain such portion at an efficient plasticizing temperature, without thereby supplying additional heat to or appreciably raising the temperature of any other portion of the heating cylinder structure and plasticizing chamber that is at the required plasticizing temperatures for the particular plastic being plasticized.

Another object is to provide such a heat supply control system in which predetermined portions of the heating cylinder structure and the plasticizing chamber therewithin are supplied with heat as required to maintain any such portion at the proper plasticizing temperature, independently of the heat supply conditions at any other portion or portions of the heating cylinder structure and the plasticizing chamber therewithin.

A further object is to provide such a heat supply control system in which a multiplicity of rod-like heating elements extend longitudinally throughout substantially the length of the heating cylinder structure and are spaced apart therearound with such heating elements selectively and independently controlled in groups to thereby supply or cut-off supply of heat to that portion of the plasticizing cylinder structure and plasticizing chamber with which any such group of heating elements is associated in heat supplying relation.

A further object is to provide such a heat supplying control system in which certain of the heating components thereof are located and positioned in the plasticizing cylinder structure in close proximity to the plasticizing chamber within such cylinder structure.

A further object is to provide such a heat supply control system in which the heating components thereof are mounted in the plasticizing cylinder structure and are automatically controlled through the medium of heat responsive components, such as thermocouples, likewise mounted in the heating cylinder structure and individually responsive to the heat conditions prevailing at particular portions of the plasticizing cylinder structure and the plasticizing chamber in such structure.

Another object is to provide such a heat supply control system in which groups of heating components are provided for control of heat supply to and of the temperatures maintained at different portions, respectively, of the plasticizing cylinder structure and plasticizing chamber therewithin with automatic selective operation of such groups of heating components to cut off supply of heat or to supply heat to the portions of the heating cylinder structure and plasticizing chamber which the groups respectively control in accordance with the heat requirements of the particular portion of the plasticizing cylinder and chamber with which a group is associated.

Another object is to provide such a heat supply control system in which the heating components thereof are located in relatively close proximity to the plasticizing chamber of a plasticizing cylinder so as to thereby reduce the extent or depth of heat conducting material through which heat must be conducted to the thermoplastic being heat softened in the plasticizing chamber with resulting decrease in the time required to heat the heat conducting structure to the degree necessary for efficient plasticizing in the plasticizing chamber.

And a further object of the invention is to provide such a heat supply controlling system for plasticizing cylinders that may be readily installed in a plasticizing cylinder without major redesigning or reorganizing of the essential plasticizing structure of such a cylinder; that will be of structural and electrical simplicity and that will be dependable and accurate in operation with the requirement for a minimum of maintenance; and that may be readily adapted to and installed in various types of plasticizing cylinders, including those known types now in general commercial use and operation.

With the foregoing and various other objects, features and results in view which will be readily apparent to those skilled in the art from the following detailed description and explanation, my invention consists in certain novel features in combination and arrangement of components and in the operation thereof, all as will be more fully referred to and specified hereinafter.

Referring to the accompanying drawings in which similar reference characters refer to corresponding parts and elements throughout the several figures thereof:

FIG. 1 is a vertical, longitudinal sectional view through a plasticizing cylinder structure of the spreader or torpedo type adapted to and incorporating therein the electric heating components and controlling components therefor in an arrangement and mounting in accordance with a heat supply control system of my invention.

FIG. 2 is a transverse sectional view through the plasticizing cylinder structure of FIG. 1, taken as on the line 2—2 of FIG. 1.

FIG. 3 is a vertical longitudinal sectional view through a plasticizing cylinder structure of the so-called melt extractor type having embodied and incorporated therein the electric heating components and controlling components therefor mounted and arranged in accordance with a heat supply control system of my present invention.

FIG. 4 is a transverse sectional view through the plasticizing cylinder structure of FIG. 3 taken as on the line 4—4 of FIG. 3.

FIG. 5 is a purely schematic view showing electrical circuits for the electrical heating components and the control components therefor arranged, combined and connected into an automatically operating heat supply control system of my invention.

As one example expression of a heat supply control system of my invention I have shown in FIG. 1 of the accompanying drawings a plasticizing cylinder structure of the generally conventional spreader or torpedo type with the electrical heating components and control components therefor of a heat supply control system in accordance with my invention mounted and incorporated therein. This example plasticizing cylinder structure is identified generally by the reference character A and comprises an external cylindrical shell S within which there is mounted coaxial therewith and extending therethrough the cylinder body C which provides therewithin the axially disposed plasticizing chamber P having the intake passage N at one end and the injection discharge passage J through the opposite end thereof. The intake passage N and injection discharge passage J are coaxial with the cylinder body C and the plasticizing chamber P therewithin. The cylinder shell S and cylinder body C are formed of material of high heat conducting characteristics, such as a suitable steel or other metal or metal alloy. The external diameter of the cylinder body C is substantially the same as the internal diameter of the bore through the shell S so that the cylinder body C fits tightly and securely in shell S in direct heat conducting contact therewith throughout the length of the shell.

Following common practice in the commercial art, a torpedo or spreader T is mounted in the plasticizing chamber P coaxial with the latter and extending throughout substantially the length of the plasticizing chamber P. As usual, the torpedo T is of streamline form with its nose end T′ located adjacent the intake end of the injection discharge passage J and its tail end T″ located spaced inwardly a distance from the inner end of the intake passage N. The torpedo T is mounted and supported at its forward end by the radially extending pads 10 spaced therearound and is mounted and supported adjacent its rear end by the radially extending pads 11 spaced therearound. The pads 10 and 11 seat at their outer ends on the inner surface of the cylinder body C that defines the plasticizing chamber P, thus positioning the torpedo T in the plasticizing chamber P. The plasticizing chamber P throughout the major extent of its length is formed into an annular passage P′ by and around the torpedo T of relatively narrow radial widths which thus forms and spreads the thermoplastic material being presure forced through chamber P into a relatively thin layer for more rapid plasticizing.

It is to be understood that the plastic material to be plasticized is pressure forced by suitable means, such as a reciprocating plunger or an extrusion screw (not shown), into chamber P through the intake passage N, through the annular passage P′ formed around the torpedo T and then outwardly through injection discharge passage J and the inpection nozzle 12 in melted and plasticized condition.

Plasticizing heat is supplied to the mass of plastic in the plasticizing chamber P by electrical resistance heating components in the form of annular heating bands mounted on and around the exterior of the shell S. In this particular example a pair of rear heating bands R are provided around the exterior of shell S in direct heat transfer relation at the rear portion of the shell with a front heating band F around the exterior of the forward end portion of the cylinder body C that projects outwardly beyond the forward end of the shell S. A heating band F′ is mounted on and around the exterior of the forwardly projecting end of the injection nozzle mounting member 12′ that is threaded into the cylinder body C and forms the forward end closure for the plasticizing chamber P. The nozzle mounting component 12′ is formed of suitable metal having high heat conducting characteristics. Thus the heating bands F′, F, and R which are in direct heat conducting relation with the nozzle mounting component 12′, the cylinder body C, and the shell S, respectively, supply heat to such structures which then conduct the heat directly to the plastic in contact with the inner surfaces of the cylinder body and of the nozzle mounting component.

The cylinder body C may, if desired, be provided with the radially inwardly extending ribs or flutes 14 spaced apart therearound and extending longitudinally therealong within the plasticizing chamber P in order to increase the heat conducting surface area of the cylinder body with which the mass of plastic in the plasticizing chamber P is in contact.

With the generally conventional plasticizing cylinder, as above described, the non-uniform heating conditions and resulting damage to and non-uniform plasticizing of the plastic, as hereinabove explained and specified, are encountered so that such types of cylinder are not fully satisfactory and efficient in operation. My present invention is directed to eliminating or overcoming such conditions in order to increase the plasticizing efficiency of a plasticizing cylinder.

In accordance with my invention I provide a system of rod-like heating components, such as the well-known Calrod electric resistance type heaters, and I mount and arrange such heaters in and around and extending along the cylinder body C between that body and the shell S with an automatic control of such heaters in groups to supply heat to the plastic in the plasticizing chamber to meet the plasticizing heat requirements of the plastic at the portions of the plasticizing cylinder with which such groups of Calrod heaters, respectively, are directly associated in heat conducting relation. For example, referring to FIGS. 1 and 2 of the accompanying drawings, an arrangement of such rod-like or Calrod type electrical resistance heaters is shown in which sixteen (16) such heating components are employed. These Calrod heating components are generally identified by the reference character CR but are specifically identified reading clockwise around the plasticizing cylinder when facing the rear or intake end thereof as heating components 1 through 16. Each of these Calrod heating components CR is identically mounted and positioned in the plasticizing cylinder structure by providing a series of sixteen (16) grooves G spaced apart equi-distant around the cylinder body C and extending throughout that portion of the length of the cylinder body over which the shell S extends. Each of the Calrod type heating components 1 through 16 is mounted in and extends through one of the grooves G in the cylinder body C with the forward end 20 of the Calrod heating component bent radially outwardly across the forward edge of shell S and then rearwardly a distance along the exterior surface of the shell. The forward end 20 of each heating component CR terminates in the connector post 21. The opposite rear end 22 of each heating component CR extends rearwardly a distance beyond the rear end of shell S and terminates in the connector post 23. The connector posts 21 and 23 of each Calrod heating component CR provide for connecting the component into an electrical circuit for supplying energizing current thereto. The grooves G with the heating components CR mounted therein are closed along their outer sides throughout the lengths thereof by the shell S in the assembled plasticizing cylinder structure A.

In the system of the example hereof, the sixteen (16) heating components CR are controlled in four (4) groups of four heating components each, the control of each group being substantially independent of the control of each of the other groups. Heating components 15—16—1—2 located over and along the uppermost or top portion of the cylinder body C comprise one group which is identified generally as group GU. Heating components 11—12—13—14 that are located over and along the left-hand side of the cylinder body C when facing the cylinder from the intake end thereof, constitute another group identified as group GL. Heating components 7—8—9—10 that are located over and along the underside of the cylinder body C constitute aonther group identified as group GB. Heating components 3—4—5—6 that are located over and along the right-hand side of the cylinder body C when facing the cylinder from the intake end thereof constitute a group identified as group GR. It is to be here noted that these heating components 1 through 16 are controlled in the four different groups as above identified and are mounted and located in the grooves G set radially inwardly into the cylinder body C in proximity to the plasticizing chamber P and a mass of plastic to be plasticized therein. Thus the heat that is supplied by the heating components 1 through 16 is required to be conducted through a reduced thickness of the heat conducting material of the body C in order to reach the inner surface of the cylinder body that forms and defines the plasticizing chamber P and which heated surface is in direct heat transfer relation and contact with the mass of plastic in the plasticizing chamber. This is a substantial advantage in the operating efficiency of these heating components 1 through 16 and contributes to the over-all plasticizing efficiency of the plasticizing cylinder A with the heat supply control system of the invention incorporated therein.

The independent control of the groups GU, GL, GB and GR is effected through thermocouples TC1, TC2, TC3 and TC4, respectively. These thermocouples may be of any of the well-known or conventional types and call for no detailed description herein. Referring now to FIG. 2 of the drawings in particular, the thermocouple TC1 is mounted in a vertical bore 30 on the vertical center line of the cylinder in the upper side thereof, this bore extending downwardly through shell S and a substantial distance into the cylinder body C between the heating components 16 and 1 and is connected to control the heating components 15—16—1—2 constituting group GU. The thermocouple TC2 is mounted in a horizontal bore 31 on the horizontal center line of the cylinder in the left-hand side thereof and extends inwardly through shell S and a substantial distance into the cylinder body C. Thermocouple TC2 is located between heating components 12 and 13. This thermocouple TC2 controls heating components 11—12—13—14 that constitute group GL. The thermocouple TC3 is mounted in a vertical bore 32 on the vertical center line of the cylinder, this bore extending upwardly through shell S and a substantial distance into the cylinder body C. The bore 32 and thermocouple TC3 mounted therein are in vertical axial alignment with the thermocouple TC1 mounted in the bore 30 at the upper side of the cylinder with thermocouple TC3 located between heating components 8 and 9. Thermocouple TC3 controls heating components 7—8—9—10 that constitute group GB. The thermocouple TC4 is mounted in a bore 33 that extends through shell S and a substantial distance into the cylinder body C on the horizontal center line of the cylinder in horizontal axial alignment with the thermocouple TC2 at the opposite side of the cylinder. The thermocouple TC4 is located between heating components 4 and 5 and is connected to control the heating components 3—4—5—6 that constitute group GR.

Each thermocouple controls a temperature indicating controller for opening and closing the heating current supply circuits to the groups of heating components under the dictation of the thermocouples. Such type of temperature indicating controllers are well known in the art and require no detailed description herein. In this instance, referring now to FIG. 5 of the drawings, the thermocouple TC1 is connected in controlling relation with the temperature indicating controller W1; the thermocouple TC2 is connected in controlling relation with the indicating controller W2; the thermocouple TC3 is connected in controlling relation with the temperature indicating controller W3; and the thermocouple TC4 is connected in controlling relation with the temperature indicating controller W4.

The rear heating bands R that are mounted on and around the exterior of shell S at the rear end portion thereof are controlled by a thermocouple TC5 that in this instance is mounted in a vertically disposed position in a vertically disposed bore 34 that extends upwardly through the underside of shell S and a substantial distance into the cylinder body C. The front heating band F that is mounted on and around the forwardly projecting end of cylinder body C and the front heating band F' that is mounted on and around the exterior of the forward end of the nozzle mounting component 12' are controlled by a thermocouple TC6 that is mounted in vertically disposed position in a vertical bore 36 that extends upwardly into the forwardly projecting end of the cylinder body C. The thermocouple TC5 for the rear heating bands R controls a temperature indicating controller W5 for opening and closing the heating current supply circuits to the heating bands R under the sensing dictation of the thermocouple TC5. The thermocouple TC6 for the forward heating bands F and F' controls a temperature indicating controller W6 for opening and closing the heating current supply circuits to the heating bands F and F' under the sensing dictation of the thermocouple TC6.

The temperature indicating controllers W1 through W6 are in this example similar and of any well-known or conventional types of such instruments. Preferably, although not essential, they may be of the well-known type that includes a direct deflection resistance galvanometer movement that gives accurate measuring and institutes precise control action by opening or closing circuit contacts at set predetermined positions into which the galvanometer moving coil or the temperature indicating pointer of the instrument are displaced under the sensing voltages applied thereto by the thermocouples in accordance with the temperature conditions acting on the thermocouples. Each of the controllers W1 through W6 is settable for opening the heating current supply circuits into which it is connected at a predetermined temperature and for closing said circuits for heat supply throughout the temperature range below the set, predetermined temperature, all as will be readily understood in the art.

*The Power Circuits and Control Circuits Therefor*

Referring now to FIG. 5, electric power for energizing the heating bands R, F and F' and the rod-like or Calrod type heating component 1 through 16 is supplied by the power circuit that includes the power circuit lines L1 and L2. The rear heating bands R are connected to the power circuit lines L1 and L2 and supplied with energizing current therefrom by the lines L3 and L4 to the controller WL and the lines L5 and L6 from the controller to the heating bands. This current supply circuit through the controller W6 is opened or closed under the dictation of the thermocouple TC5. The front heating bands F1 and F' are connected to the power circuit lines L1 and L2 and supplied with energizing current therefrom by circuit lines L7 and L8 from lines L1 and L2 to the controller W5 and by the lines L9 and L10 from the controller to the heating bands. The current supply circuit through the controller W5 is opened or closed under the dictation of the thermocouple TC6. Group GU comprised of the Calrod type heating components 15—16—1—2 is connected to the power circuit lines L1 and L2 by the lines L11 and L12 from lines L1 and L2 to the controller W1 and by the lines L13 and L14 from the controller to the heating components of the group GU. The energizing current supply circuit through the controller W1 is opened or closed under the dictation of the thermocouple TC1. Group GL comprised of the Calrod type heating components 11—12—13—14 is connected to the power supply lines L1 and L2 by the lines L15 and L16 from lines L1 and L2 to the controller W2 and by lines L17 and L18 from the controller to the group of heating components GL. The energizing current supply circuit through controller W2 is opened or closed under the dictation of the thermocouple TC2. Group GB, comprised of the Calrod type heating components 7—8—9—10, is connected with the power circuit lines L1 and L2 by the lines L19 and L20 from lines L1 and L2 to the controller W3 and by the lines L21 and L22 from the controller to the group of heating components GB. The circuit through controller W3 is opened or closed to cut off or supply energizing current to group GB under the dictation of the thermocouple TC3. Group GR comprised of the Calrod type heating components 3—4—5—6 is connected with the power lines L1 and L2 by the lines L23 and L24 from lines L1 and L2 and the controller W4 and lines L25 and L26 from the controller to the group of heating components GR. The energizing current supply circuit through controller W4 is opened or closed to cut off or supply energizing current to the group of heating components GR under the dictation of the thermocouple TC4.

The thermocouple TC1 which dictates to and controls the controller W1 is connected to the controller by the control circuit lines C1 and C2. The thermocouple TC2 which dictates to and controls the controller W2 is connected to the controller by the control circuit lines C3 and C4. The thermocouple TC3 which dictates to and controls the controller W3 is connected to the controller by the control circuit lines C5 and C6. The thermocouple TC4 which dictates to and controls the controller W4 is connected to the controller by the control circuit lines C7 and C8. The thermocouple TC5 which dictates to and controls the controller W5 is connected to the controller by the control circuit lines C9 and C10. The thermocouple TC6 which dictates to and controls the controller W6 is connected to the controller by the control circuit lines C11 and C12. Each of the thermocouples, as hereinabove identified, is activated or operated by a certain predetermined temperature that is attained in the location in which each such thermocouple is mounted in the heat conducting material of the plasticizing cylinder structure and will, when such temperature is reached, generate a voltage to effect operation of the controller with which it is connected to thereby cause operation of that controller to cut off the energizing current supply to the heating component or components with which such controller is connected.

*Operation*

With the plasticizing cylinder A of the form of FIGS. 1 and 2 having incorporated therein the heat supply control system of the invention as disclosed in such figures in connection with FIG. 5, the controller W1 is set for operation to open the energizing circuit to heating component group GU by the thermocouple TC1 when the temperature in the section of the upper portion of the plasticizing cylinder in which thermocouple TC1 is located has reached a predetermined temperature. When the predetermined temperature is reached, it causes the thermocouple TC1 to generate a voltage that is transmitted through control circuit lines C1 and C2 to the controller W1 which then operates to open the current supply circuit L11—L12—L13—L14 to the Calrod type heating components 15—16—1—2 of the heating component group G1 that extends along and is spaced apart across the upper side of the heating cylinder. Thus supply of heat to the upper part of the cylinder by the group GU is stopped until the temperature at the thermocouple TC1 falls below the predetermined temperature at which time the thermocuple TC1 operates to cause the controller W1 to operate to close the current supply circuit to the group GU to thereby energize the heating components of that group to again supply heat to the upper portion of the heating cylinder to bring that portion of the cylinder to the required proper temperature for efficient plasticizing in the plasticizing chamber P of the cylinder. This control of the heat supplied to the upper portion of the heating cylinder by the group GU is independent of the operation of the group of heating components GL over and along the left-hand side of the plasticizing cylinder A, the group of heating components GB over and along the underside of the plasticizing cylinder A, and the group of heating components GR over and along the right-hand side of the plasticizing cylinder A. The operation of each heating component group is thus independent of the operation of each of the other groups and is dependent upon the temperature condition as sensed by the thermocouple for each group to thereby automatically supply heat to any portion of the plasticizing cylinder and plasticizing chamber requiring heat and to stop supply of heat to any portion being supplied with too much heat.

The operation and functioning of group GL by its controlling components TC2 and W2, of the group GB by its controlling components TC3 and W3, and of the group GR by its controlling components TC4 and W4 is the same as that above described in detail in connection with the operation and functioning of the group GU under the control of its controlling components TC1 and W1.

The rear heating bands R and the front heating bands F and F' are operated and function concurrently with the automatic operation of the groups of Calrod type heating components GU, GL, GB and GR. The controller W5 for the current supply circuits to the rear heating bands R is set for a predetermined temperature as sensed by the thermocouple TC5 so as to cause operation of the controller to open the current supply circuit L3—L4—L5—L6 when the temperature at which the thermocouple TC5 is located reaches the predetermined temperature and is operated to close such current supply circuit when the temperature at the thermocouple TC5 falls below the predetermined temperature.

The controller W6 for the front heating bands F and F' is set to open the current supply circuit L7—L8—L9—L10 when the temperature at the location of the thermocouple TC6 reaches the predetermined temperature and operates to close such supply circuit when the temperature at the thermocouple TC6 falls below the predetermined temperature.

Thus, by a system of the invention the heat supplied to all portions of the plasticizing cylinder can be maintained at the required temperatures for complete and uniform plasticizing without overheating and burning and contamination of the plastic or underheating with incomplete plasticizing. The amount of heat supplied to a portion of the cylinder receiving insufficient heat may be increased to that required without thereby supplying additional heat to other portions of the plasticizing cylinder receiving the proper and required amount of heat, thereby eliminating one of the serious operating conditions and resulting inefficiencies of the known types and forms of plasticizing cylinders. The operation of the heat supply control system of the invention is fully automatic and requires only the setting of each of the controllers W1 through W6 for operation at a selected predetermined temperature so that the heating components which each controller controls will supply throughout the plasticizing cycle the required heat for that portion of the plasticizing cylinder which such components serve or will cut off the supply of heat whenever necessary to avoid oversupply of heat.

*Melt Extractor Type Plasticizing Cylinder*

A heat supply control system in accordance with my invention is not only adapted to the conventional types of torpedo or spreader plasticizing cylinders, such as the plasticizing cylinder A, but is equally adapted to incorporation in and control of heat supply to plasticizing cylinders of various other types and constructions, such for example as the highly efficient so-called melt extractor types of cylinders. In FIGS. 3 and 4 a melt extractor type of plasticizing cylinder AA is disclosed as incorporating a heat supply control system of the invention which in all essential respects is identical with the heat control system in the form and expression thereof as disclosed in FIGS. 1, 2 and 5 and described in detail hereinabove. In the melt extractor type heating cylinder AA shown in FIGS. 3 and 4, the cylinder includes a cylinder body CC which is mounted in and extends through a shell SS all in the manner as described and explained in connection with the cylinder A of FIG. 1. The melt extractor plasticizing cylinder AA has, however, in place of the plasticizing chamber P with the torpedo T of FIG. 1, a sleeve member 50 that provides therewithin the plasticizing chamber 51. This sleeve member 50 is mounted in the cylinder body CC between an intake mouth member 52 and a retainer or distributor member 53 having the general form of a double cone. The sleeve member 50 is provided with the rib members or flutes 54 extending radially into and spaced apart around the plasticizing chamber 51 with these rib members extending substantially throughout the length of the sleeve member. A plurality of melt receiving and flowing channels 55 are provided spaced apart around and extending longitudinally along the outer side of the sleeve member 50 with these channels 55 being closed at their inner intake ends and being open at their forward discharge ends 56. A plurality of perforations or ducts 57 are provided through the side wall of the sleeve member 50 throughout the lengths of the channels 55 placing the latter in communication with the plasticizing chamber 51 for flow of plastic melt from the plasticizing chamber into the channels.

The distributor member 53 is positioned in the assembly axially aligned with the sleeve member 50 with the inner conical end of the distributor member closing the forward open end of the sleeve member and extending a distance into the latter. The distributor member has external diameters less than the interinal diameters of the cylinder body CC so as to form thereround an annular passage 58 into which the channels 55 discharge and through which the melted plastic flows to the injection discharge JJ and the injection discharge nozzle 12. The cylinder assembly is provided with an intake passage NN through the intake mouth member 52 with this passage NN discharging into the open intake end of the melt extractor sleeve member. The operation and functioning of such melt extractor cylinder is familiar to the art and it is also known to the art that this type of plasticizing cylinder has a greatly increased plasticizing and operational efficiency over the conventional torpedo type of cylinder shown in FIG. 1.

The heat supply control system of my invention as supplied to the melt extractor type of plasticizing cylinder AA of FIGS. 3 and 4 is identical with such system as applied to the conventional torpedo type plasticizing cylinder of FIG. 1 as to components, power and control circuits and operation and functioning, so that it is not believed necessary to describe such system in detail in connection with the form of cylinder of FIG. 3. In the melt extractor type cylinder of FIG. 3 the rear heating bands R, front heating bands F and F', the rod-like or Calrod type heating components CR, specifically identified as 1 through 16, connected into the groups of heating components GU, GL, GB and GR, together with the thermocouples TC1, TC2, TC3, TC4, TC5 and TC6, the controllers W1, W2, W3, W4, W5 and W6, and the power supply and control circuits, are all mounted, arranged and operatively connected as shown in FIGS. 1, 2 and 5 and as described to detail hereinabove in connection with the torpedo type plasticizing cylinder of FIG. 1. The operation and functioning of the heat supply control system as incorporated in the melt extractor type plasticizing cylinder AA is also identical with the operation and functioning of the system as described and explained in connection with the plasticizing cylinder A of FIG. 1.

It will also be evident that various other changes, modifications, variations, eliminations substitutions and additions may be resorted to without departing from the broad spirit and scope of my invention, and hence I do not intend or desire to limit my invention to the exact and specific examples thereof herein disclosed, except as may be required by intended limitations thereto appearing in any of the claims hereto appended.

What I claim is:

1. In combination, a plasticizing cylinder structure including a cylinder body of heat conducting material providing a plasticizing chamber therewithin having an intake at one end and an injection discharge therefrom at the opposite end of said cylinder structure; a shell member of heat conducting material mounted on and over said cylinder body in direct heat conducting, surface-to-surface contact with said cylinder body; a plurality of rod-like heating components of the electrical resistance type spaced apart in and around said cylinder body between said body and said shell member extending longitudinally therealong throughout substantially the length of said shell member; said shell member at the end thereof adjacent said injection discharge from said cylinder body terminating at a location spaced a distance inwardly along said cylinder body from said injection discharge thereof; a heating band of the electrical resistance type mounted on and around said shell member adjacent the end thereof at the intake end of said cylinder body; a heating band of the electrical resistance type mounted on and around said cylinder body between said injection discharge therefrom and the adjacent end of said shell member; said rod-like heating components at different locations over and along said cylinder body constituting independent groups, respectively; said heating bands constituting independent heating components, respectively; an independent electrical current supply circuit connected to each of said groups of rod-like heating components; an independent electrical current supply circuit connected to each of said heating bands; a temperature-responsive means mounted in said cylinder body at the location of each group of said independent groups of said rod-like heating components; a temperature-responsive means mounted in said assembly of cylinder body and shell member at locations therein to be heated by said heating bands, respectively; an electrically operated control means connected in each of said supply circuits operable to open or close its said supply circuit; and a control circuit connecting each of said temperature-responsive means with said supply circuit control means for each said group of rod-like heating components and for each of said heating bands for operating said control means to open or close said supply circuit in accordance with heat conditions prevailing in said cylinder body and plasticizing chamber at the location of said heat-responsive means.

2. In combination, a plasticizing cylinder structure including a cylinder body of heat conducting material providing a plasticizing chamber therewithin having an intake at one end and an injection discharge therefrom at the opposite end of said cylinder structure; a shell member of heat conducting material mounted over and along said cylinder body in direct surface-to-surface heat conducting contact therewith around and along the length of said shell member; said cylinder body having therein a plurality of parallel grooves extending longitudinally therealong, spaced apart therearound and opening through the outer side thereof; said grooves in said cylinder body being closed along said open sides by said shell member; rod-like heating components of the electrical resistance type mounted in and extending through said grooves in said cylinder body; said shell member at the end thereof adjacent said injection discharge terminating spaced a distance inwardly along said cylinder body from said injection discharge; said rod-like heating components extending outwardly from said assembly of said cylinder body and said shell member at the ends thereof adjacent said injection discharge and being bent outwardly and inwardly along the exterior side of said shell member to provide connection terminals thereon; said rod-like heating components also extending outwardly beyond the end of said shell member at said injection end of said cylinder body to provide connection terminals thereon; said rod-like heating components at different locations along said cylinder body consistuting independent groups, respectively; an independent electrical current supply circuit connected to the oposite terminal ends of said rod-like heating components of each of said groups of said heating components; a temperature-responsive means mounted in said cylinder body at the location of each group of said independent groups of said rod-like heating components; an electrically operated control means connected in each of said supply circuits operable to open or close its said supply circuit; and a control circuit connecting each said temperature-responsive means with said supply circuit control means for each said group of heating components for operating said control means to open or close said supply circuit in accordance with heat conditions prevailing in said cylinder body and plasticizing chamber at the location of said heat-responsive means.

3. In combination, a plasticizing cylinder body of heat conducting material providing a plasticizing chamber therewithin having an intake at one end and an injection discharge therefrom at the opposite end of said cylinder body; a shell member of heat conducting material mounted on and over said cylinder body in direct heat conducting, surface-to-surface contact therewith therealong and therearound; a plurality of rod-like heating components of the electrical resistance type spaced apart around and extending along said cylinder body between said shell member and the said cylinder body substantially throughout the length of said shell member; said shell member at the end thereof adjacent said injection discharge from said cylinder body terminating at a location spaced a distance inwardly along said cylinder body from said injection discharge; a heating band of the electrical resistance type mounted on and around said cylinder body between the injection discharge end thereof and the adjacent end of said shell member; said rod-like heating components at different locations along said cylinder body constituting independent groups, respectively; an independent electrical current supply circuit connected into each of said groups of said rod-like heating components for supplying energizing current thereto; a temperature-responsive means mounted in said cylinder body at the location of each group of said independent groups of said rod-like heating components; an electrically operated control means connected in each of said supply circuits operable to open or close its said supply circuit; a control circuit connecting each said temperature-responsive means with said supply circuit control means for each said group of heating components; and means for operating said heating band independently of said groups of said rod-like heating components.

References Cited in the file of this patent

UNITED STATES PATENTS

| | | |
|---|---|---|
| 2,402,805 | Cousino | June 25, 1946 |
| 2,508,988 | Bradley | May 23, 1950 |
| 2,721,729 | Van Riper | Oct. 25, 1955 |
| 2,820,132 | Krause | Jan. 14, 1958 |
| 2,853,590 | Zandel | Sept. 23, 1958 |